(12) United States Patent
Fujimori et al.

(10) Patent No.: US 6,847,426 B2
(45) Date of Patent: Jan. 25, 2005

(54) LIQUID CRYSTAL DISPLAY DEVICE

(75) Inventors: Kohichi Fujimori, Mie (JP); Yozo Narutaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/261,692

(22) Filed: Oct. 2, 2002

(65) Prior Publication Data

US 2003/0117551 A1 Jun. 26, 2003

(30) Foreign Application Priority Data

| Oct. 2, 2001 | (JP) | ........................................ | 2001-306039 |
| Jun. 27, 2002 | (JP) | ........................................ | 2002-187146 |
| Aug. 28, 2002 | (JP) | ........................................ | 2002-248385 |

(51) Int. Cl.[7] .......................................... G02F 1/1333
(52) U.S. Cl. ........................ 349/113; 349/106; 349/110; 349/112; 349/122; 349/162
(58) Field of Search ................................ 349/113, 114, 349/106, 122, 108, 112, 139, 143, 107, 162, 110

(56) References Cited

U.S. PATENT DOCUMENTS

| 4,632,514 | A | 12/1986 | Ogawa et al. |
| 5,150,235 | A | 9/1992 | Haim et al. |
| 5,510,916 | A | 4/1996 | Takahashi |
| 6,124,909 | A | 9/2000 | Miyashita et al. |
| 6,195,140 | B1 | 2/2001 | Kubo et al. |
| 6,215,538 | B1 | 4/2001 | Narutaki et al. |
| 6,281,952 | B1 | 8/2001 | Okamoto et al. |
| 6,452,654 | B2 | 9/2002 | Kubo et al. |
| 6,476,889 | B2 * | 11/2002 | Urabe et al. ................. 349/106 |
| 6,509,942 | B2 | 1/2003 | Tanaka et al. |
| 6,563,559 | B2 | 5/2003 | Noritake |
| 6,661,484 | B1 | 12/2003 | Iwai et al. |
| 6,747,718 | B2 | 6/2004 | Kanou et al. |
| 2001/0019385 | A1 | 9/2001 | Song et al. |
| 2002/0003596 | A1 * | 1/2002 | Kim ........................... 349/106 |

(List continued on next page.)

FOREIGN PATENT DOCUMENTS

| JP | 4-44250 B2 | 7/1992 |
| JP | 11-109331 | 4/1996 |
| JP | 8-286178 | 11/1996 |
| JP | 10-142621 | 5/1998 |
| JP | 11-295736 | 10/1999 |
| JP | 2000-111902 | 4/2000 |
| JP | 2000-305110 | 11/2000 |
| WO | WO 03/003075 | 1/2003 |

OTHER PUBLICATIONS

U.S. Appl. No. 09/695,400, filed Oct. 25, 2000 entitled "Color Filter Layer and Display Device Using the Same".
U.S. Appl. No. 10/260,248, filed Oct. 1, 2002 entitled Liquid Crystal Display Device.

*Primary Examiner*—Toan Ton
*Assistant Examiner*—Tai Duong
(74) *Attorney, Agent, or Firm*—Nixon & Vanderhye P.C.

(57) ABSTRACT

The liquid crystal display device includes a first substrate, a second substrate, a liquid crystal layer interposed between the first and second substrates, and a plurality of picture-element regions for providing display. Each of the plurality of picture-element regions has a transmission region for providing display in a transmission mode by using light incident through the first substrate, and a reflection region for providing display in a reflection mode by using light incident through the second substrate. The second substrate has a color filter layer provided in the transmission region and the reflection region. The thickness of the color filter layer in at least a part of the reflection region is smaller than the thickness of the color filter layer in the transmission region.

17 Claims, 15 Drawing Sheets

U.S. PATENT DOCUMENTS

| | | | |
|---|---|---|---|
| 2002/0036730 A1 * | 3/2002 | Baek et al. ................. 349/106 |
| 2002/0054269 A1 | 5/2002 | Maeda et al. |
| 2002/0113927 A1 | 8/2002 | Ha et al. |
| 2003/0030767 A1 | 2/2003 | Takizawa et al. |
| 2003/0076464 A1 | 4/2003 | Ozawa et al. |
| 2003/0160914 A1 | 8/2003 | Ha |

* cited by examiner

000
LIQUID CRYSTAL DISPLAY DEVICE

BACKGROUND OF THE INVENTION

1. Field of the Invention

The present invention generally relates to a liquid crystal display device (LCD). More particularly, the present invention relates to a transmission/reflection combination type LCD capable of providing display in transmission and reflection modes.

2. Description of the Background Art

Liquid crystal display devices (LCDs) are thin, low power consumption display devices. Because of such characteristics, the LCDs are recently used in a variety of applications including office automation (OA) equipments such as word processors and personal computers, portable information equipments such as electronic organizers, and camera-incorporated VTRs (video tape recorders) having a liquid crystal monitor.

These LCDs are roughly divided into two types: reflection type and transmission type. An LCD is not a self-light-emitting display device such as CRT (cathode ray tube) and EL (electroluminescence). In order to provide display, a transmission-type LCD uses light of an illuminating device provided behind a liquid crystal display (LCD) panel (so-called backlight), whereas a reflection-type LCD uses ambient light.

A transmission-type LCD provides display by using light from the backlight. Therefore, display is less susceptible to the brightness of the surrounding environment. As a result, the transmission-type LCD is capable of providing bright display having a high contrast ratio, but has large power consumption due to the backlight. The backlight consumes about 50% or more of the power consumption of a normal transmission-type LCD. Moreover, visibility is reduced if the transmission-type LCD is used in a very bright environment (e.g., outdoor in fine weather). If the luminance of the backlight is increased in order to maintain the visibility, power consumption would further be increased.

On the other hand, a reflection-type LCD does not have a backlight, and therefore has extremely low power consumption. However, the brightness and the contrast ratio of display are significantly affected by the surrounding environment such as brightness in the environment. Especially, visibility is significantly reduced when the reflection-type LCD is used in a dark environment.

In order to solve the above problems, a transmission/reflection combination type LCD capable of providing display in both reflection and transmission modes has been proposed.

The transmission/reflection combination type LCD has a reflecting picture-element electrode (a picture-element electrode which reflects ambient light) and a transmitting picture-element electrode (a picture-element electrode which allows light from the backlight to transmit therethrough) in each picture-element region. Therefore, the transmission/reflection combination type LCD is capable of switching the display mode between the transmission mode and the reflection mode or providing display in both display modes according to the surrounding environment (brightness in the environment). Accordingly, the transmission/reflection combination type LCD has characteristics of both the reflection-type LCD and the transmission-type LCD. In other words, the transmission/reflection combination type LCD has low power consumption, is less affected by brightness in the environment, and is capable of providing bright display with a high contrast ratio. Moreover, the disadvantage of the transmission-type LCD (reduced visibility in a very bright environment (e.g., outdoor in fine weather)) is suppressed.

As described above, the transmission/reflection combination type LCD provides display in a transmission region by using light from the backlight, and provides display in a reflection region by using ambient light. Therefore, if the transmission/reflection combination type LCD has a color filter, the number of times the light passes through the color filter is different between the transmission region and the reflection region. Although the light emitted from the transmission region toward a viewer has passed through the color filter only once, the light emitted from the reflection region toward the viewer has passed through the color filter twice. This makes it difficult to implement bright display with high color purity (excellent color reproduction) in both transmission and reflection regions in the transmission/reflection combination type LCD.

In order to solve the above problem, Japanese Laid-Open Publication No. 2000-111902 discloses an LCD in which a reflection region has a region having no color filter layer.

However, the LCD disclosed in the above Japanese Laid-Open Publication No. 2000-111902 provides display in the reflection region by mixing light passing through the region having the color filter layer and white light passing through the region having no color filter layer. Therefore, although reduction in transmittance in the reflection region is suppressed and light utilization efficiency is improved, color purity of display is not high enough.

SUMMARY OF THE INVENTION

The present invention is made in view of the above problems, and it is an object of the present invention is to provide a liquid crystal display device (LCD) capable of implementing bright display with high color purity in both transmission and reflection regions.

According to the present invention, a liquid crystal display device includes a first substrate, a second substrate, a liquid crystal layer interposed between the first and second substrates, and a plurality of picture-element regions for providing display. Each of the plurality of picture-element regions has a transmission region for providing display in a transmission mode by using light incident through the first substrate, and a reflection region for providing display in a reflection mode by using light incident through the second substrate. The second substrate has a color filter layer provided in the transmission region and the reflection region. A thickness of the color filter layer in at least a part of the reflection region is smaller than a thickness of the color filter layer in the transmission region. The above object is thus achieved.

Preferably, the second substrate has a transparent substrate, and a transparent dielectric layer formed between the transparent substrate and the color filter layer in at least the part of the reflection region.

A plurality of transparent dielectric layers may be provided in each reflection region.

The transparent dielectric layer may have a light-diffusing function.

Preferably, a thickness of the liquid crystal layer in the transmission region is larger than a thickness of the liquid crystal layer in the reflection region.

A level of a surface of the first substrate which faces the liquid crystal layer may be higher in the reflection region than in the transmission region.

The second substrate may have the color filter layer on its surface facing the liquid crystal layer. A height of the color filter layer may be greater in at least the part of the reflection region where the transparent dielectric layer is formed than in the transmission region, whereby a level of a surface of the second substrate which faces the liquid crystal layer may be higher in the reflection region than in the transmission region. A level of a surface of the first substrate which faces the liquid crystal layer may be substantially the same in both the reflection region and the transmission region.

Hereinafter, the effects of the present invention will be described.

In the LCD of the present invention, the thickness of the color filter layer in at least a part of the reflection region is smaller (thinner) than the thickness of the color filter layer in the transmission region. This suppresses reduction in transmittance in the reflection region and improves light utilization efficiency. Accordingly, display in the reflection region does not become dark even if the color filter layer is formed almost over the whole reflection region in order to provide display having high color purity in the reflection region. As a result, bright display having high color purity (excellent color reproduction) is implemented in both the transmission region and the reflection region.

In the case where the transparent dielectric layer is formed between the transparent substrate and the color filter substrate in at least a part of the reflection region, the material of the color filter layer has a reduced thickness on the transparent dielectric layer. Therefore, the thickness of the color filter layer on the transparent dielectric layer becomes smaller (thinner) than the thickness of the color filter layer in the region having no transparent dielectric layer. Accordingly, the color filter layer having the above thickness distribution can be easily obtained. Therefore, in the case where the transparent dielectric layer is formed between the transparent substrate and the color filter layer in at least a part of the reflection region, an LCD capable of implementing bright display with high color purity in both the transmission region and the reflection region can be manufactured by a simple manufacturing process.

In the case where a plurality of transparent dielectric layers are provided in each reflection region, a color filter layer having the above thickness distribution can be reliably obtained.

In the case where the transparent dielectric layer has a light-diffusing function, light passing through the reflection region is diffused, whereby white display close to paper white is implemented.

In order to allow display light passing through the transmission region and light transmitting through the reflection region to have the same optical path length, the thickness of the liquid crystal layer in the transmission region is preferably larger (thicker) than the thickness of the liquid crystal layer in the reflection region. Typically, the thickness of the liquid crystal layer in the transmission region is about twice the thickness of the liquid crystal layer in the reflection region.

Such a multi-gap structure (the structure in which the thickness of the liquid crystal layer in the transmission region is larger than the thickness of the liquid crystal layer in the reflection region) is implemented by making the level of the surface of the first and/or second substrates which faces the liquid crystal layer higher in the reflection region than in the transmission region.

For example, by forming a reflecting electrode on an interlayer insulating film having a predetermined thickness, the level of the surface of the first substrate which faces the liquid crystal layer can be made higher in the reflection region than in the transmission region.

In the case where the second substrate has the color filter layer on its surface facing the liquid crystal layer, the level of the surface of the second substrate which faces the liquid crystal layer can be made higher in the reflection region than in the transmission region by, e.g., making the height of the color filter layer (i.e., the level of the surface of the color filter layer which faces the liquid crystal layer) in a region having the transparent dielectric layer within the reflection region higher than the height of the color filter layer (i.e., the level of the surface of the color filter layer which faces the liquid crystal layer) in the transmission region. In this case, the level of the surface of the first substrate which faces the liquid crystal layer may be substantially the same in both the transmission and reflection regions. In other words, the level of the surface of the first substrate which faces the liquid crystal layer may be substantially the same in both the transmission and reflection regions. This eliminates the need for a process of elevating the surface of the first substrate in the reflection region (such as a process of forming an interlayer insulating film as described above), and thus simplifies a manufacturing process of an LCD having a multi-gap structure. In the case where the surface of the first substrate which faces the liquid crystal layer is elevated in the reflection region, a region which does not contribute to display (an invalid region) is generated in the boundary between the reflection region and the transmission region. However, the use of the above structure prevents generation of such an invalid region, and thus enables further improvement in brightness.

Note that the terms "thickness", "height" and "level" are used in the specification. The "thickness" indicates the thickness of the component itself, and the "height" and "level" indicate the height (distance) from a certain reference surface (e.g., the surface of a glass substrate which is flat across the whole surface of a liquid crystal panel) to the surface of the component.

According to the present invention, an LCD capable of implementing bright display with high color purity in both transmission and reflection regions is provided.

In the LCD of the present invention, the thickness of the color filter layer in at least a part of the reflection region is smaller than the thickness of the color filter layer in the transmission region. This suppresses reduction in light utilization efficiency in the reflection region, whereby bright display having high color purity can be implemented in both transmission and reflection regions.

In the case where the transparent dielectric layer is formed between the transparent substrate and the color filter layer in at least a part of the reflection region, an LCD capable of providing high quality display as described above can be efficiently manufactured by a simple manufacturing process.

DETAILED DESCRIPTION OF THE PREFERRED EMBODIMENTS

Hereinafter, a liquid crystal display device (LCD) according to embodiments of the present invention will be described in conjunction with the accompanying drawings. Note that embodiments of the present invention will be described regarding an active matrix LCD using thin film transistors (TFTs). However, the present invention is not limited to this. The present invention is also applicable in a preferable manner to an active matrix LCD using MIM (metal insulator metal) and a simple matrix LCD.

First Embodiment

Figure 1:
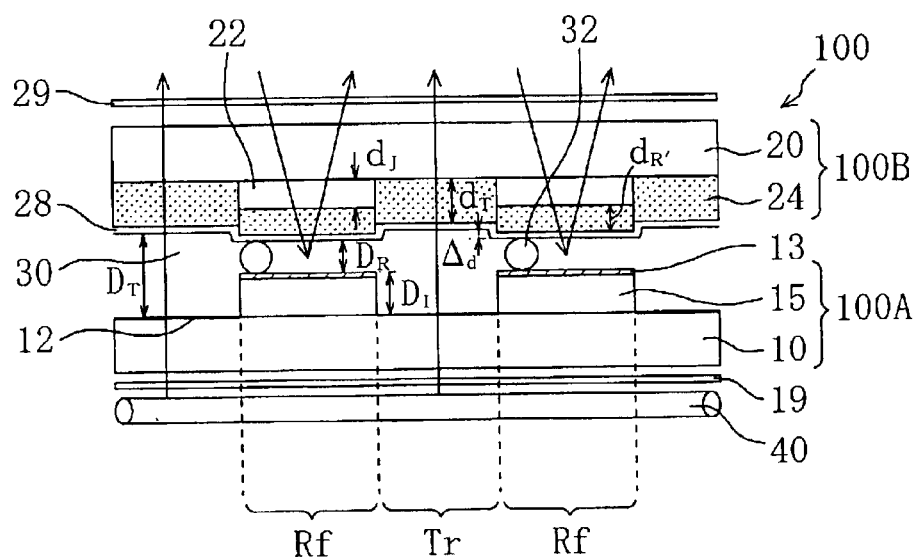
FIG. 1 is a schematic cross-sectional view of a liquid crystal display device (LCD) 100 according to a first embodiment of the present invention.
Figure 2:
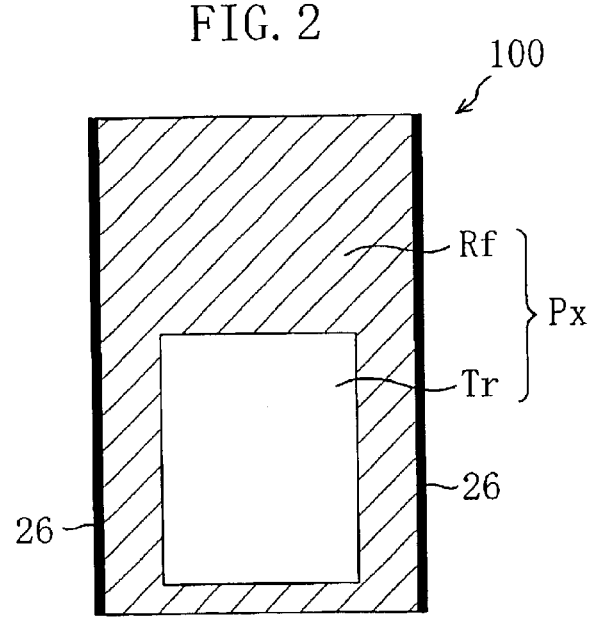
FIG. 2 is a schematic top view of the LCD 100 according to the first embodiment of the present invention.

First, the structure of an LCD 100 according to the first embodiment of the present invention will be described with reference to FIGS. 1 and 2. FIG. 1 is a schematic cross-sectional view of the LCD 100. FIG. 2 is a schematic top view showing the structure of a single picture-element region in the LCD 100. In the specification, the minimum unit of display is referred to as "picture element", and a region of the LCD which corresponds to a "picture element" is referred to as "picture-element region".

As shown in FIG. 1, the LCD 100 includes an active matrix substrate (first substrate) 100A, a color filter substrate (second substrate) 100B, and a liquid crystal layer 30 interposed therebetween. Typically, the LCD 100 further includes a pair of polarizing plates 19, 29 and an illuminating device (backlight) 40. The pair of polarizing plates 19, 29 are provided on both sides of the LCD 100, and the illumination device (backlight) 40 is provided outside the polarizing plate 19 so as to face the active matrix substrate 100A.

As shown in FIGS. 1 and 2, the transmission/reflection combination type LCD 100 has a transmission region Tr and a reflection region Rf for every plurality of picture-element regions Px arranged in a matrix, and is capable of providing display in transmission and reflection modes. In other words, the transmission/reflection combination type LCD 100 is capable of providing display either in one of the transmission and reflection modes or in both transmission and reflection modes. The transmission region Tr of the LCD 100 is defined by a region of the active matrix substrate 100A, i.e., a region having both a function as an electrode for applying a voltage to the liquid crystal layer 30 and a light-transmitting function. The reflection region Rf of the LCD 100 is defined by a region of the active matrix substrate 100A, that is, a region having both a function as an electrode for applying a voltage to the liquid crystal layer 30 and a light-reflecting function.

The active matrix substrate 100A has a transparent insulating substrate (e.g., glass substrate) 10. Elements such as thin film transistors (TFTs), scanning lines and signal lines (all of which are not shown) are formed on the transparent insulating substrate 10. The TFTs are arranged in a matrix, and the scanning lines and the signal lines are each electrically connected to a corresponding TFT.

As shown in FIG. 1, the active matrix substrate 100A has a transparent electrode 12 in each transmission region Tr and a reflecting electrode 13 in each reflection region Rf. Each transparent electrode 12 and each reflecting electrode 13 are electrically connected to a corresponding TFT, and function as picture-element electrodes. The transparent electrode 12 is formed from a transparent conductive material such as ITO (indium tin oxide), and the reflecting electrode 13 is formed from a high reflectance metal such as aluminum.

In the present embodiment, the reflecting electrode 13 is formed on an interlayer insulating film (e.g., acrylic resin layer) 15. The level of the surface of the active matrix substrate 100A which faces the liquid crystal layer 30 is higher in the reflection region Rf than in the transmission region Tr. Note that, although FIG. 1 shows the interlayer insulating film 15 having a flat surface, the interlayer insulating film 15 may alternatively have a gently undulating surface.

The active matrix substrate 100A can be manufactured by a known method using a known material. An alignment layer (not shown) is formed as necessary on the surface of the active matrix substrate 100A which faces the liquid crystal layer 30.

As shown in FIG. 1, the color filter substrate 100B of the LCD 100 has a transparent dielectric layer 22 and a color filter layer 24. The transparent dielectric layer 22 and the color filter layer 24 are provided on the surface of a transparent insulating substrate (e.g., glass substrate) 20 which faces the liquid crystal layer 30.

As shown in FIG. 1, the transparent dielectric film 22 is formed in at least a part of the reflection region Rf, and is interposed between the transparent insulating substrate 20 and the color filter layer 24.

The color filter layer 24 is formed in both the transmission region and the reflection region. Typically, the color filter layer 24 is formed almost in the whole transmission region and the whole reflection region, and has color layers of red (R), green (G) and blue (B) and a black matrix 26 provided in the gap between the color layers. The thickness of the color filter layer 24 in at least a part of the reflection region Rf is smaller (thinner) than the thickness of the color filter layer 24 in the transmission region Tr. More specifically, the thickness $d_{R'}$ of the color filter layer 24 that is located on the transparent dielectric layer 22 is smaller than the thickness $d_T$ of the color filter layer 24 that is not located on the transparent dielectric layer 22.

The color filter substrate 100B has a counter electrode 28 for applying a voltage to the liquid crystal layer 30. Typically, the counter electrode 28 is a single counter electrode 28 shared by all picture-element regions, and is provided on the surface of the color filter layer 24 which faces the liquid crystal layer 30.

Liquid crystal layers of known various modes can be used as the liquid crystal layer 30 interposed between the active matrix substrate 100A and the color filter substrate 100B. In the present embodiment, the thickness of the liquid crystal layer 30 is defined (controlled) by spherical spacers 32 provided in the reflection region Rf, and the thickness $D_R$ of the liquid crystal layer 30 in the reflection region Rf is smaller than the thickness $D_T$ of the liquid crystal layer 30 in the transmission region Tr. Typically, the thickness $D_R$ in the reflection region Rf is about half the thickness $D_T$ in the transmission region Tr.

Hereinafter, a method for manufacturing the LCD 100 will be described. Since the active matrix substrate 100A of the LCD 100 can be manufactured by a known method, description thereof is omitted.

First, the color filter substrate 100B is manufactured. Hereinafter, a method for manufacturing the color filter substrate 100B will be described in detail with reference to FIGS. 3A, 3B and FIGS. 4A to 4C. It is herein assumed that the color filter substrate 100B has a color filter layer 24 having three color layers.

Figure 3A:
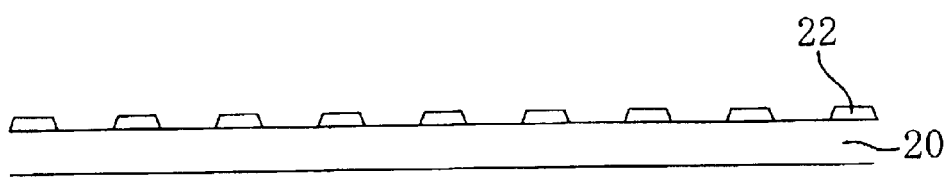
FIGS. 3A and 3B are a schematic cross-sectional view and a schematic top view, respectively, illustrating a manufacturing process of a color filter substrate 100B in the LCD 100 according to the first embodiment of the present invention.
Figure 3B:
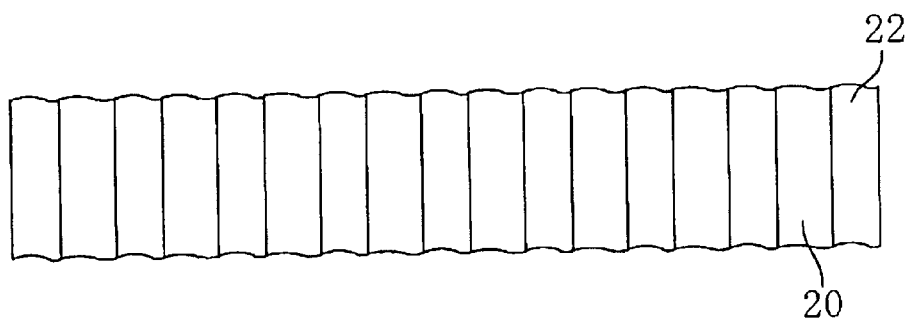

First, as shown in FIGS. 3A and 3B, the transparent dielectric layer 22 is formed on the transparent insulating substrate 20 within each reflection region Rf. For example, the transparent dielectric layer 22 is formed as follows:

A negative transparent acrylic photosensitive material (e.g., acrylic resin made by Japan Synthetic Rubber Co., Ltd.) is applied to the transparent insulating substrate 20 formed from glass or the like. In the present embodiment, the negative transparent acrylic photosensitive material is applied with a thickness of about 1.4 μm. It should be appreciated that the present invention is not limited to the negative transparent acrylic photosensitive material, and any known photosensitive material may be used. Thereafter, the negative transparent acrylic photosensitive material thus applied is subjected to pattern exposure using active light. The resultant negative transparent acrylic photosensitive material is then developed by an alkaline developer and washed in water. The negative transparent acrylic photosensitive material is then heat treated, whereby the transparent dielectric layer 22 is formed as shown FIGS. 3A and 3B.

Note that the method for forming the transparent dielectric layer 22 is not limited to the above method, and another method such as a patterning method by etching, a printing method or a transfer method may be used. In FIG. 3B, the transparent dielectric layer 22 has a stripe pattern. However, the present invention is not limited to this, and the transparent dielectric layer 22 may be formed like a plurality of islands.

Figure 4A:
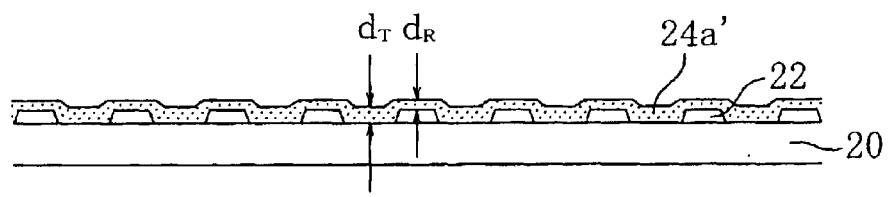
FIGS. 4A, 4B and 4C are schematic cross-sectional views illustrating the manufacturing process of the color filter substrate 100B in the LCD 100 according to the first embodiment of the present invention.
Figure 4B:
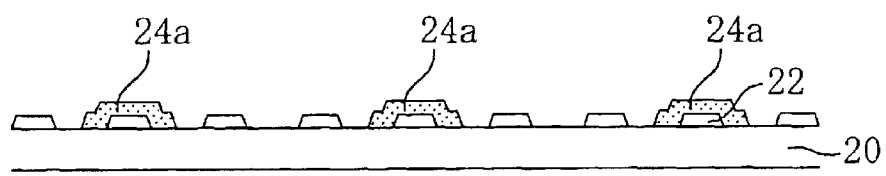
Figure 4C:
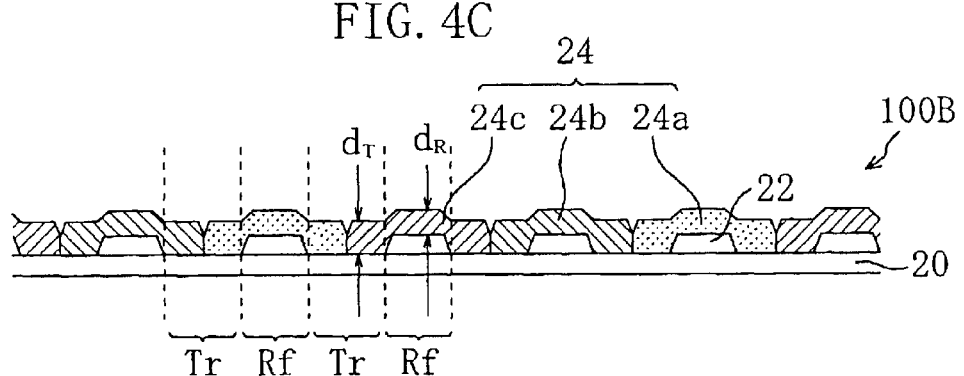

As shown in FIG. 4C, the color filter layer 24 is formed on the transparent insulating substrate 20 having the transparent dielectric layer 22 thereon. For example, the color filter layer 24 is formed as follows by using a pigment dispersion method:

First, as shown in FIG. 4A, an acrylic pigment-dispersing photosensitive material 24a' for forming a first color layer (e.g., red layer) 24a is applied to the transparent insulating substrate 20. The transparent insulating substrate 20 has an uneven surface due to the transparent dielectric layer 22, but the surface of the acrylic pigment-dispersing photosensitive material 24a' thus applied to the uneven surface of the transparent insulating substrate 20 is more or less planarized. Therefore, as shown in FIG. 4A, the thickness $d_R$ of the acrylic pigment-dispersing photosensitive material 24a' on the transparent dielectric layer 22 is smaller than the thickness $d_T$ of the acrylic pigment-dispersing photosensitive material 24a' on the transparent insulating substrate 20. In other words, the acrylic pigment-dispersing photosensitive material 24a' has a reduced thickness on the transparent dielectric layer 22. In the present embodiment, the acrylic pigment-dispersing photosensitive material 24a' has a thickness $d_T$ of about 0.7 μm on the transparent insulating substrate 20. Note that the acrylic pigment-dispersing photosensitive material 24a' may either have an uneven surface as shown in FIG. 4A or a completely planarized surface (substantially flat surface).

As shown in FIG. 4B, the acrylic pigment-dispersing photosensitive material 24a' thus applied is then subjected to pattern exposure using active light. The resultant acrylic pigment-dispersing photosensitive material 24a' is then developed by an alkaline developer and washed in water. The acrylic pigment-dispersing photosensitive material 24a' is then heat treated, whereby the first color layer 24a is formed.

Thereafter, as shown in FIG. 4C, a second color layer (e.g., blue layer) 24b and a third color layer (e.g., green layer) 24c are similarly formed using an acrylic pigment-dispersing photosensitive material for forming the second color layer 24b and an acrylic pigment-dispersing photosensitive material for forming the third color layer 24c. The color filter layer 24 having three color layers is thus produced.

Thereafter, the counter electrode 28 is formed on the color filter layer 24 by using a transparent conductive material (e.g., ITO). The color filter substrate 100B is thus completed.

The color filter substrate 100B thus produced and the active matrix substrate 100A prepared separately are laminated each other with a predetermined gap therebetween. Before lamination, the surface of each substrate 100A, 100B which faces the liquid crystal layer 30 is subjected to an alignment process as necessary.

The transparent dielectric layer 22 of the color filter substrate 100B is located in either a part of the reflection region Rf or the whole reflection region Rf when the color filter substrate 100B and the active matrix substrate 100A are laminated each other. Upon lamination, the color filter substrate 100B and the active matrix substrate 100A are positioned so that the transparent dielectric layer 22 is not located in the transmission region Tr.

After the color filter substrate 100B and the active matrix substrate 100A are thus laminated each other, a liquid crystal material is introduced into the gap therebetween. The LCD 100 is thus completed.

If necessary, the color filter substrate 100B may have a light-shielding layer (black matrix) for shielding leakage light from the gap between pixels. In order to prevent light passing through the transmission region Tr from contributing directly to display through the transparent dielectric layer 22 (i.e., from being emitted toward a viewer through the transparent dielectric layer 22), it is preferable to form the transparent dielectric layer 22 so that the transparent dielectric layer 22 is not located in the transmission region Tr even if the two substrates 100A, 100B are misaligned in the laminating step. In other words, it is preferable to form the transparent dielectric layer 22 in view of a margin of misalignment.

In the transmission region Tr, the transmission/reflection combination type LCD 100 provides display by using incident light from the backlight 40 located near the active matrix substrate 100A (on the side opposite to the viewer). The light incident from the backlight 40 passes through the color filter layer 24 once before being emitted toward the viewer. In the reflection region Rf, however, the transmission/reflection combination type LCD 100 provides display by using ambient light incident from the viewer side (such as sunlight, light from an indoor illuminating equipment, or light from an illumination device provided at the front of the LCD 100). The light incident from the viewer side is reflected by the reflecting electrode 13 toward the viewer. Therefore, the light incident from the viewer side passes through the color filter layer 24 twice before being emitted toward the viewer.

In the LCD 100 of the present embodiment, the thickness of the color filter layer 24 in at least a part of the reflection region Rf is smaller (thinner) than the thickness of the color filter layer 24 in the transmission region Tr. This suppresses reduction in transmittance in the reflection region Rf, and improves light utilization efficiency. Accordingly, display in the reflection region Rf does not become dark even if the color filter layer 24 is formed almost in the whole reflection region Rf as shown in FIG. 1 in order to improve color purity. As a result, the LCD 100 of the present invention implements bright display with high color purity (excellent color reproduction) in both the transmission region Tr and the reflection region Rf.

The thickness $d_T$ of the color filter layer 24 in the transmission region Tr and the thickness $d_{R'}$ of the color filter layer 24 in the reflection region Rf are preferably determined so that chromaticity characteristics of the color filter layer 24 in the transmission region Tr match those of the color filter layer 24 in the reflection region Rf as much as possible (as close as possible). Provided that the thickness of the color filter layer 24 is determined so that chromaticity characteristics in the transmission region Tr are close to those in the reflection region Rf, a change in chromaticity is suppressed even if the intensity (or quantity) of ambient light changes abruptly (e.g., even if the sunlight is incident suddenly or a vehicle running in the daytime enters a tunnel). Therefore, the viewer does not feel uncomfortable to see display. As a result, display with high visibility is implemented in every environment.

Figure 5:
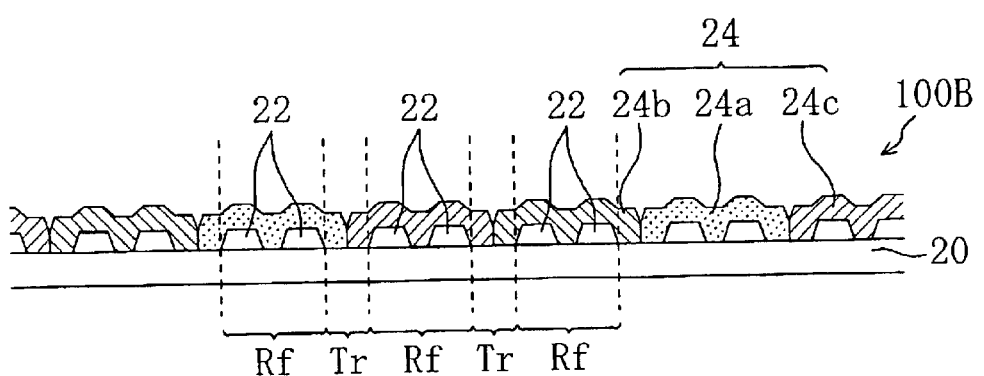
FIG. 5 is a schematic cross-sectional view of another color filter substrate 100B that can be used in the LCD 100 according to the first embodiment of the present invention.

Note that, in the present embodiment, a single transparent dielectric layer 22 is formed within each reflection region, as shown in FIG. 4C. As shown in FIG. 5, however, a plurality of transparent dielectric layers 22 may alternatively be formed within each reflection region. In other words, the transparent dielectric layers 22 may be formed within each reflection region Rf in a dispersed manner.

Figure 6A:
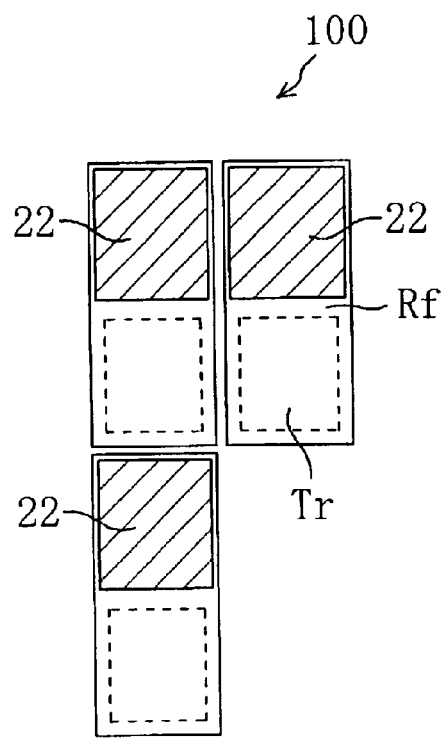
FIGS. 6A and 6B are schematic top views of the LCD 100 according to the first embodiment of the present invention.

As shown in FIG. 6A, in the LCD 100 of the present embodiment, the transparent dielectric layers 22 each having a rectangular shape of about 70 μm×about 100 μm are arranged at intervals of about 20 μm in the direction of the scanning lines and at intervals of about 140 μm in the direction of the signal lines. The pixel size is about 85 μm×about 250 μm.

Table 1 below shows the measurement result of a chromaticity value (x, y) and brightness (Y value) in the transmission region Tr and the reflection region Rf of the color filter substrate 100B having the transparent dielectric film 22 formed as shown in FIG. 6A. Table 1 also shows color reproducibility in the transmission region Tr and the reflection region Rf. Note that the chromaticity value (x, y) and the brightness (Y value) in Table 1 were calculated on the assumption that light passes through the reflection region Rf twice. The color reproduction range is the area of a triangle defined by three points of red (R), green (G) and blue (B) on the x-y chromaticity coordinates.

TABLE 1

| | R | G | B | W | | Color Reproduction |
|---|---|---|---|---|---|---|
| | x/y | x/y | x/y | x/y | Y | Range |
| Transmission Region | 0.4472/ 0.2788 | 0.3175/ 0.4496 | 0.1756/ 0.2462 | 0.2965/ 0.3262 | 50.1 | 0.0253 |
| Reflection Region (Light passes therethrough twice) | 0.4491/ 0.2779 | 0.3179/ 0.4518 | 0.1695/ 0.2397 | 0.2964/ 0.3269 | 48.6 | 0.0268 |

As shown in Table 1, the ratio of the color reproduction range in the transmission region Tr to the color reproduction range in the reflection region Rf is about 1:1.06. In other words, the color reproduction range in the transmission region Tr almost matches the color reproduction range in the reflection region Rf. Moreover, as shown in Table 1, the brightness (Y value) in the transmission region Tr almost matches the brightness (Y value) in the reflection region Rf.

Figure 6B:
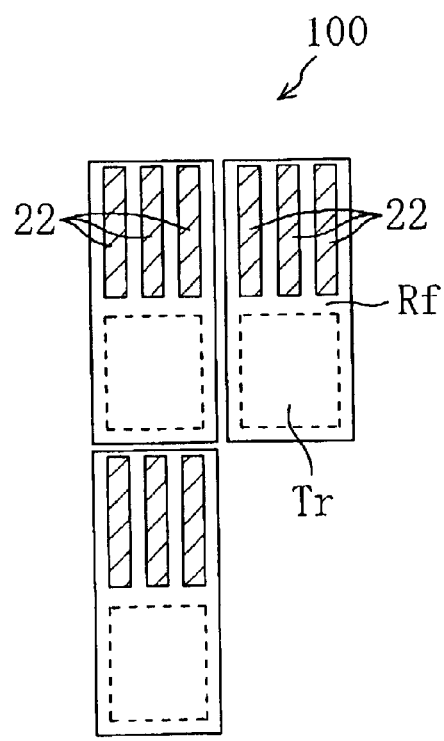

Table 2 below shows the chromaticity value (x, y), brightness (Y value) and color reproducibility which were obtained in the case where three transparent dielectric layers 22 each having a size of about 10 μm×about 100 μm are arranged in each reflection region Rf at intervals of about 15 μm in the direction of the scanning lines as shown in FIG. 6B.

TABLE 2

| | R | G | B | W | | Color Reproduction |
|---|---|---|---|---|---|---|
| | x/y | x/y | x/y | x/y | Y | Range |
| Transmission Region | 0.4472/ 0.2788 | 0.3175/ 0.4496 | 0.1756/ 0.2462 | 0.2965/ 0.3262 | 50.1 | 0.0253 |
| Reflection Region (Light passes therethrough twice) | 0.4475/ 0.2779 | 0.3179/ 0.4502 | 0.1721/ 0.2452 | 0.2964/ 0.3263 | 49.9 | 0.0258 |

As shown in Table 2, the ratio of the color reproduction range in the transmission region Tr to the color reproduction range in the reflection region Rf is about 1:1.02. In other words, the color reproduction range in the transmission region Tr further matches the color reproduction range in the reflection region Rf as compared to the case where the transparent dielectric layers 22 are formed as shown in FIG. 6A. Moreover, as shown in Table 2, the brightness (Y value) in the transmission region Tr further matches the brightness (Y value) in the reflection region Rf as compared to the case of FIG. 6A.

Hereinafter, the LCD 100 of the present invention and the conventional LCD disclosed in Japanese Laid-Open Publication No. 2000-111902 (the LCD in which a region having no color filter layer is present in a reflection region) are compared in terms of their capabilities according to the simulation result.

Figure 7:
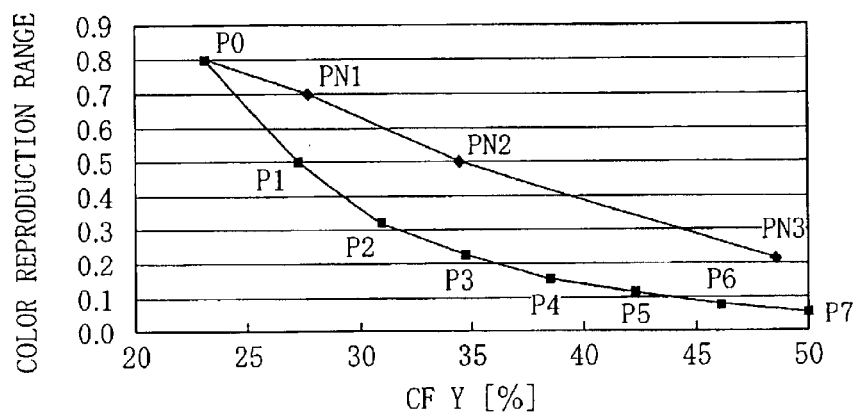
FIG. 7 is a graph showing the simulation result of color reproducibility and brightness of a color filter layer 24 in the LCD 100 of the present invention and a color filter layer in a conventional LCD.

FIG. 7 shows the simulation result of the color reproducibility of the color filter layer 24 in the LCD 100 of the present invention and the color filter layer in the conventional LCD. In the graph of FIG. 7, the abscissa indicates the Y value, i.e., brightness of the color filter layer, and the ordinate indicates the color reproduction range of the color filter layer (herein, the NTSC (National Television System Committee) ratio).

Note that the NTSC ratio is a ratio of the area of a triangle defined by three points of red (R), green (G) and blue (B) on the x-y chromaticity coordinates to a reference area, and is given by SA/S. The reference area S is the area of the triangle defined by three points of red (x:0.670, y:0.330), green (x:0.210, y:0.710) and blue (x:0.140, y:0.080). The area SA is the area of a triangle defined by three points of red, green and blue of a sample color filter layer on the chromaticity coordinates.

The color filter layer 24 in the LCD 100 of the present invention and the color filter layer in the conventional LCD used in the simulation were formed from a color plate (a material of the color filter layer) having the following optical characteristics upon reflection in both reflection and transmission regions: red (x:0.670, y:0.326), green (x:0.286, y:0.648) and blue (x:0.131, y:0.120), NTSC ratio:79.9%, and Y value: 22.9 (which corresponds to P0 in FIG. 7).

In FIG. 7, "■" indicates characteristics of the color filter layer in the conventional LCD, and P0, P1, P2, P3, P4, P5, P6 and P7 indicate the simulation result obtained by increasing the area of the region having no color filter layer in increments of 5% of the area of the reflection region. As shown in FIG. 7, in the color filter layer of the conventional LCD, the Y value (brightness) and the reflectance are improved as the area of the region having no color filter layer is increased. However, the color reproduction range (NTSC ratio) is significantly reduced as the area of the region having no color filter layer is increased. Accordingly, improving the Y value by increasing the area of the region having no color filter layer results in whitish color tone. In other words, the color tone is degraded. As shown in FIG. 7, the color reproduction range reduces with a downward-projecting curved profile with increase in Y value.

In FIG. 7, "♦" indicates characteristics of the color filter layer 24 in the LCD 100 of the present invention, and P0, PN1, PN2 and PN3 indicate the simulation result obtained by reducing the thickness of the color filter layer 24 in the reflection region Rf in decrements of 25%. As shown in FIG. 7, in the color filter layer 24 of the LCD 100 of the present invention, the Y value (brightness) and the reflectance are improved as the thickness of the color filter layer 24 in the reflection region Rf is reduced. As the Y value is improved, the color reproduction range (NTSC ratio) is reduced.

However, the reduction in the color reproduction range is less than that in the color filter layer of the conventional LCD. As shown in FIG. 7, in the color filter layer 24 of the LCD 100 of the present invention, the color reproduction range reduces with a linear profile with increase in Y value.

As described above, the color reproduction range of the color filter layer in the conventional LCD reduces with a downward-projecting curved profile with increase in Y value, whereas the color reproduction range of the color filter layer 24 in the LCD 100 of the present invention reduces with a linear profile with increase in Y value. Therefore, at the same Y value, the color filter layer 24 of the LCD 100 of the present invention exhibits a greater color reproduction range than the color filter layer of the conventional LCD. For example, at the Y value of 35%, the color reproduction range (NTSC ratio) is 0.23 (near P3 in FIG. 7) for the color filter layer of the conventional LCD, but is 0.48 (near PN2 in FIG. 7) for the color filter layer 24 of the LCD 100 of the present invention.

With the same color reproduction range (NTSC ratio), the color filter layer 24 of the LCD 100 of the present invention exhibits a greater Y value than the color filter layer of the conventional LCD. For example, with the color reproduction range (NTSC ratio) of 0.5, the Y value is 27 (near P1 in FIG. 7) for the color filter layer of the conventional LCD, but is 34 (near PN2 in FIG. 7) for the color filter layer 24 of the LCD 100 of the present invention.

It can be appreciated from the above result that the color filter layer 24 of the LCD 100 of the present invention exhibits improved brightness and improved color reproduction range over the color filter layer of the conventional LCD.

In the reflection-type display using ambient light (outside light), it is more difficult to obtain a sufficient contrast ratio than in the transmission-type display using light from the backlight. Moreover, not only the characteristics of the color filter layer but also conditions of the liquid crystal layer and the like must be considered in an actual LCD. Therefore, in an actual LCD, it is more difficult to implement display having both an excellent color reproduction range and excellent brightness as compared to the case where only the characteristics of the color filter layer are considered. In other words, the color filter layer 24 of the LCD 100 of the present invention is superior to the color filter layer of the conventional LCD when being applied to an actual LCD. Accordingly, the LCD 100 of the present invention can provide reflection-type display having both excellent brightness and an excellent color reproduction range. As a result, the LCD 100 of the present invention can provide bright display with high color purity (excellent color reproduction) in both transmission and reflection regions.

As described above, in the LCD 100 of the present invention, the thickness of the color filter layer 24 in at least a part of the reflection region Rf is smaller than the thickness of the color filter layer 24 in the transmission region Tr. In the present embodiment, the transparent dielectric layer 22 is formed in at least a part of the reflection region Rf in order to reduce the thickness of the color filter layer 24 on the transparent dielectric layer 22. The above thickness distribution of the color filter layer 24 is thus produced.

Figure 8A:
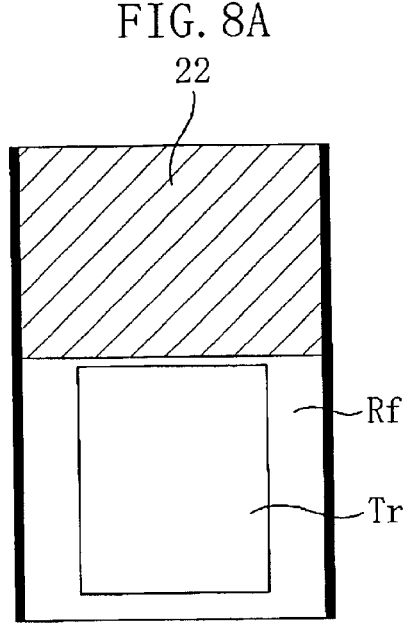
FIGS. 8A, 8B, 8C and 8D are schematic top views of the LCD 100 according to the first embodiment of the present invention.
Figure 8B:
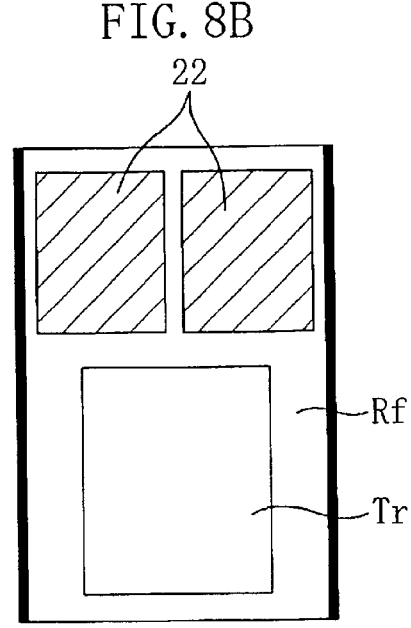
Figure 8C:
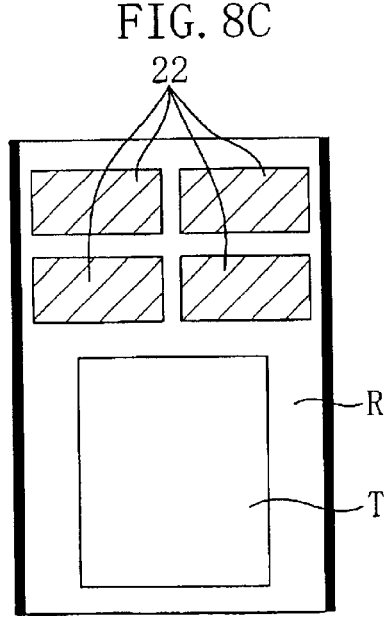
Figure 8D:
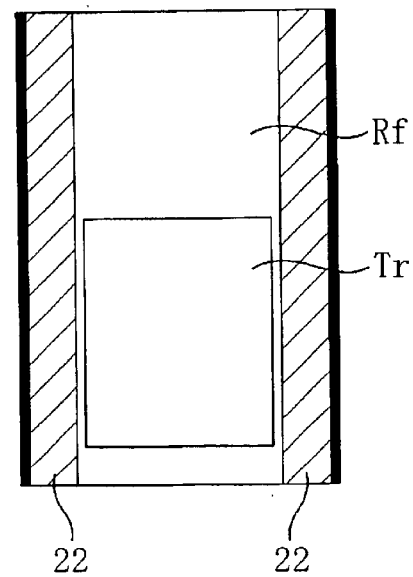
Figure 9:
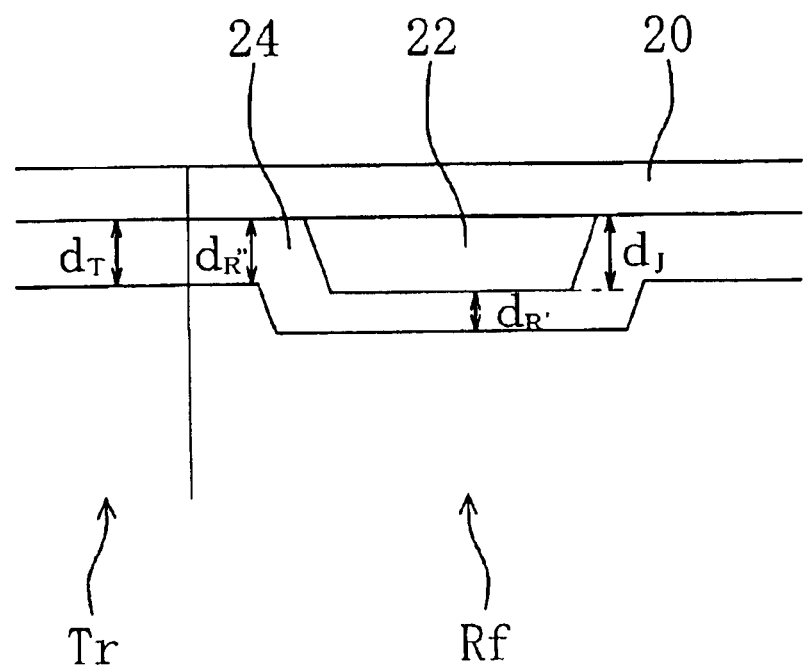
FIG. 9 is a schematic cross-sectional view of the color filter substrate 100B in the LCD 100 according to the first embodiment of the present invention.

As shown in, e.g., FIGS. 8A to 8D, the transparent dielectric layer 22 is formed in at least a part of the reflection region Rf. As shown in FIG. 8A, a single transparent dielectric layer 22 may be formed in each reflection region Rf. As shown in FIGS. 8B, 8C and 8D, a plurality of transparent dielectric layers 22 may alternatively be formed in each reflection region Rf. As shown in FIG. 9, the overall color purity of the reflection region Rf is determined by the average of the color purity of a region corresponding to a smaller thickness of the color filter layer 24 located on the transparent dielectric layer 22 (the region of the thickness $d_{R'}$) and the color purity of a region corresponding to a greater thickness of the color filter layer 24 that is not located on the transparent dielectric layer 22 (the region of the thickness $d_{R''}$).

If the material of the color filter layer 24 has excellent coverage characteristics, the thickness of the color filter layer 24 may hardly be reduced despite the transparent dielectric layer 22 formed within the reflection region Rf. In other words, the thickness of the color filter layer 24 located on the transparent dielectric layer 22 may not be sufficiently reduced.

In this case as well, the thickness of the color filter layer 24 on the transparent dielectric layer 22 can be controlled by appropriately determining the shape and thickness of the transparent dielectric layer 22. Hereinafter, the relation between the shape and thickness of the transparent dielectric layer 22 and the thickness of the color filter layer 24 located on the transparent dielectric layer 22 will be described with reference to Tables 3, 4 and FIG. 10.

Table 3 below shows the thickness $d_{R'}$ of the color filter layer 24 on the transparent dielectric layer 22 at various occupation ratios of the transparent dielectric layer 22 in the reflection region Rf (the area ratio of the transparent dielectric layer 22 to the reflection region Rf) and with various shapes and thicknesses $d_J$ of the transparent dielectric layer 22. Note that, in the example of Table 3, the area ratio of the transmission region Tr to the reflection region Rf was about 1:1 and the material of the color filter layer 24 was applied so that the color filter layer 24 has a thickness $d_T$ of about 1.2 μm in the transmission region Tr. In Table 3, "30 μm☐" indicates that the transparent dielectric layer 22 has a square shape of about 30 μm×about 30 μm. The same applies to "50 μm☐" and "72 μm ☐".

Table 4 below shows the ratios $d_J/d_T$, $d_{R'}/d_T$ obtained with various thicknesses $d_J$ of the transparent dielectric layer 22. The ratio $d_J/d_T$ is a ratio of the thickness $d_J$ of the transparent dielectric layer 22 to the thickness $d_T$ of the color filter layer 24 in the transmission region Tr. The ratio $d_{R'}/d_T$ is a ratio of the thickness $d_{R'}$ of the color filter layer 24 on the transparent dielectric layer 22 to the thickness $d_T$ of the color filter layer 24 in the transmission region Tr. In the example of Table 4, the transparent dielectric layer 22 has a rectangular shape of about 70 μm×about 100 μm, and the color filter layer 24 in the transmission region Tr has a constant thickness $d_T$.

Figure 10:
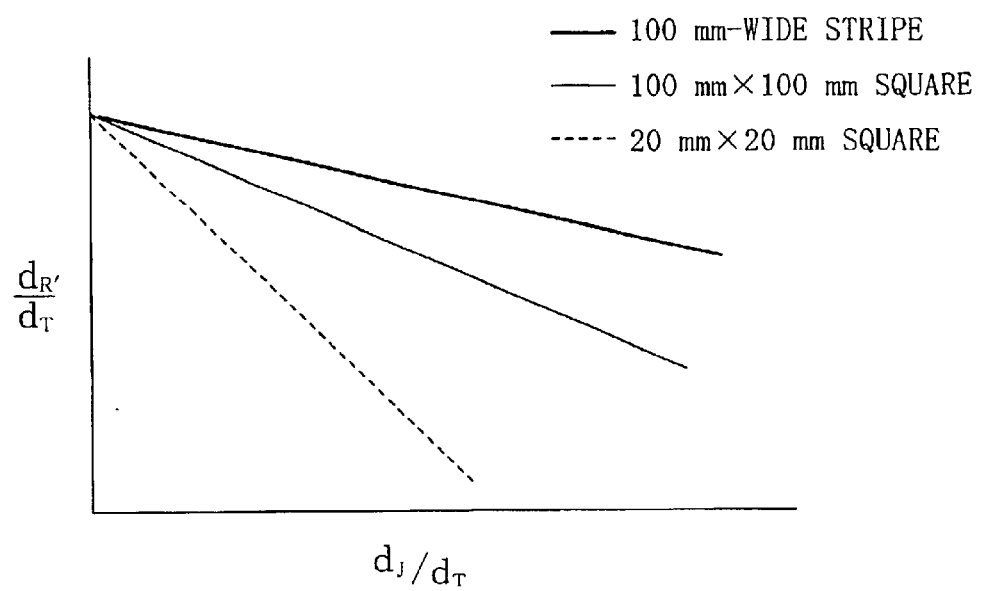
FIG. 10 is a graph showing the relation between the ratios $d_I/d_T$ and $d_{R'}/d_T$ in the case where a transparent dielectric layer 22 has a stripe shape having a width of about 100 μm, a square shape of about 100 μm×about 100 μm, or a square shape of about 20 μm×about 20 μm.

FIG. 10 is a graph of the ratios $d_J/d_T$, $d_{R'}/d_T$ obtained when the transparent dielectric layer 22 has a stripe shape having a width of about 100 μm, a square shape of about 100 μm×about 100 μm, or a square shape of about 20 μm×about 20 μm.

TABLE 3

| Occupation Ratio of Transparent Dielectric Layer (%) | Shape of Transparent Dielectric Layer | Thickness $d_j$ of Transparent Dielectric Layer (μm) | Thickness $d_{R'}$ of Color Filter Layer on Transparent Dielectric Layer (μm) |
|---|---|---|---|
| 30 | 30 μm☐ | 0.8 | 0.58 |
| 30 | 30 μm☐ | 1.2 | 0.42 |
| 30 | 30 μm☐ | 1.6 | 0.20 |
| 52 | 50 μm☐ | 0.8 | 0.73 |
| 52 | 50 μm☐ | 1.2 | 0.62 |
| 52 | 50 μm☐ | 1.6 | 0.45 |
| 87 | 72 μm☐ | 0.8 | 0.84 |
| 87 | 72 μm☐ | 1.2 | 0.71 |
| 87 | 72 μm☐ | 1.6 | 0.53 |

TABLE 4

| $d_J/d_T$ | 0.5 | 1.0 | 1.5 | 2.0 |
|---|---|---|---|---|
| $d_{R'}/d_T$ | 0.85 | 0.7 | 0.6 | 0.5 |

Figure 11A:
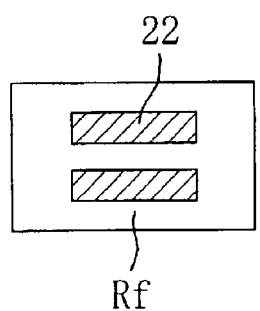
FIGS. 11A and 11B are schematic top views showing a layout example of the transparent dielectric layer 22 in a reflection region Rf.
Figure 11B:
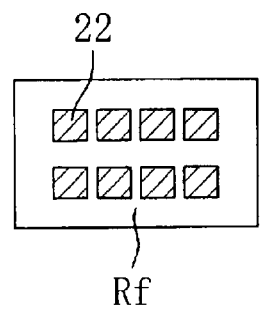

It can be appreciated from Tables 3, 4 and FIG. 10 that the relation between the shape and thickness $d_J$ of the transparent dielectric layer 22 and the thickness $d_{R'}$ of the color filter layer 24 on the transparent dielectric layer 22 varies depending on the material of the color filter layer 24 and properties of the surface of the transparent dielectric layer 22, but generally has the following tendencies (1) to (3):

(1) As the thickness $d_J$ of the transparent dielectric layer 22 is increased, the thickness $d_{R'}$ of the color filter layer 24 on the transparent dielectric layer 22 is reduced;

(2) As the occupation ratio of the transparent dielectric layer 22 in the reflection region Rf is increased, the thickness $d_{R'}$ of the color filter layer 24 on the transparent dielectric layer 22 is reduced; and (3) Provided that the occupation ratio (area) of the transparent dielectric layer 22 in the reflection region Rf is the same, the thickness $d_{R'}$ of the color filter layer 24 on the transparent dielectric layer 22 is smaller when a plurality of smaller transparent dielectric layers 22 are provided in each reflection region Rf than when a single transparent dielectric layer 22 is provided in each reflection region Rf. In other words, the thickness $d_{R'}$ of the color filter layer 24 on the transparent dielectric layer 22 is smaller when the transparent dielectric layers 22 are formed in a dispersed manner within the reflection region Rf. Moreover, provided that the occupation ratio (area) of the transparent dielectric layer 22 is the same, the thickness $d_{R'}$ of the color filter layer 24 on the transparent dielectric layer 22 is reduced as the number of transparent dielectric layers 22 is increased, that is, as a greater number of smaller island-shaped transparent dielectric layers 22 are formed. For example, the thickness $d_{R'}$ of the color filter layer 24 on the transparent dielectric layer 22 is smaller in FIG. 11B (a greater number of smaller, island-shaped transparent dielectric layers 22 are provided) than in FIG. 11A (a smaller number of larger, stripe-shaped transparent dielectric layers 22 are provided).

The thickness $d_{R'}$ of the color filter layer 24 on the transparent dielectric layer 22 can be controlled by appropriately determining the shape and thickness of the transparent dielectric layer 22 in view of the above tendencies (1) to (3).

Hereinafter, the thickness of the liquid crystal layer 30 in the LCD 100 of the first embodiment will be described.

In the LCD 100 of the first embodiment, the thickness $D_T$ of the liquid crystal layer 30 in the transmission region Tr is larger (thicker) than the thickness $D_R$ of the liquid crystal layer 30 in the reflection region Rf. Typically, the thickness $D_R$ of the liquid crystal layer 30 in the reflection region Rf is about half the thickness $D_T$ of the liquid crystal layer 30 in the transmission region Tr.

Light used for display in the reflection mode is incident through the color filter substrate 100B, passes through the liquid crystal layer 30 and is reflected by the reflecting electrode 13. The reflected light again passes through the liquid crystal layer 30 and is emitted from the color filter substrate 100B. Therefore, the light used for display in the reflection mode passes through the liquid crystal layer 30 twice. In the present embodiment, the thickness $D_R$ of the liquid crystal layer 30 in the reflection region Rf is about half the thickness $D_T$ of the liquid crystal layer 30 in the transmission region Tr. This ensures that the light used for display in the reflection mode has the same optical path length as that of the light used for display in the transmission mode.

As described above, in the LCD 100 of the present embodiment, the thickness $D_T$ of the liquid crystal layer 30 in the transmission region Tr is larger than the thickness $D_R$ of the liquid crystal layer 30 in the reflection region Rf, and the optical path length of the light passing through the transmission region Tr is the same as that of the light passing through the reflection region Rf. This enables implementation of display with a high contrast ratio.

For example, the LCD 100 can be manufactured by the following method in order to make the thickness $D_T$ of the liquid crystal layer 30 in the transmission region Tr larger than the thickness $D_R$ of the liquid crystal layer 30 in the reflection region Rf.

First, the color filter substrate 100B is manufactured as follows:

The transparent dielectric layer 22 having a thickness of about 0.7 µm is first formed on the transparent insulating substrate 20. The color filter layer 24 is then formed on the transparent insulating substrate 20 having the transparent dielectric layer 22 thereon. More specifically, the color filter layer 24 is formed so as to have a thickness of about 0.7 µm in a region having no transparent dielectric layer 22. The color filter layer 24 thus formed has a reduced thickness of about 0.6 µm on the transparent dielectric layer 22.

A grinding process is then conducted in order to reduce the thickness of the color filter layer 24 on the transparent dielectric layer 22 to about 0.35 µm. As a result, the difference in level Δd between the surface of the color filter layer 24 on the transparent dielectric layer 22 and the surface of the color filter layer 24 in the region having no transparent dielectric layer 22 is about 0.35 µm. Thereafter, elements such as counter electrode 28 are formed, whereby the color filter substrate 100B is produced.

In addition to the color filter substrate 10B, the active matrix substrate 100A having an elevated surface in the reflection region Rf is manufactured separately.

More specifically, the interlayer insulating film 15 is first formed in the reflection region Rf by using, e.g., a positive photosensitive resin made by Japan Synthetic Rubber Co., Ltd. The interlayer insulating film 15 thus formed is subjected to mask exposure, development and baking processes in order to cause the interlayer insulating film 15 to have an uneven surface. In this example, the interlayer insulating film 15 having an uneven surface has a thickness $D_I$ (average value) of about 2.1 µm.

The reflecting electrode 13 is then formed on the interlayer insulating film 15 by using, e.g., aluminum. The reflecting electrode 13 formed on the uneven surface of the interlayer insulating film 15 has an uneven surface and thus exhibits excellent scattering characteristics.

The color filter substrate 100B and the active matrix substrate 100A thus produced are then laminated each other after columnar spacers having a height of about 2.5 µm or spherical beads (spherical spacers) having a diameter of about 2.5 µm are disposed within the reflection region Rf.

In the LCD 100 thus manufactured, the thickness $D_R$ of the liquid crystal layer 30 in the reflection region Rf is defined by the columnar spacers or the spherical beads. Therefore, the thickness $D_R$ is about 2.5 µm. On the other hand, the thickness $D_T$ of the liquid crystal layer 30 in the transmission region Tr is about 4.95 µm ($=D_R+D_I+\Delta d \approx 2.5+2.1+0.35$). Accordingly, the ratio of the thickness $D_T$ of the liquid crystal layer 30 in the transmission region Tr to the thickness $D_R$ of the liquid crystal layer 30 in the reflection region Rf is about 2:1.

In this way, the LCD 100 having a multi-gap structure, the structure in which the liquid crystal layer 30 has different thicknesses between the transmission region Tr and the reflection region Rf, is obtained.

Second Embodiment

Figure 12:
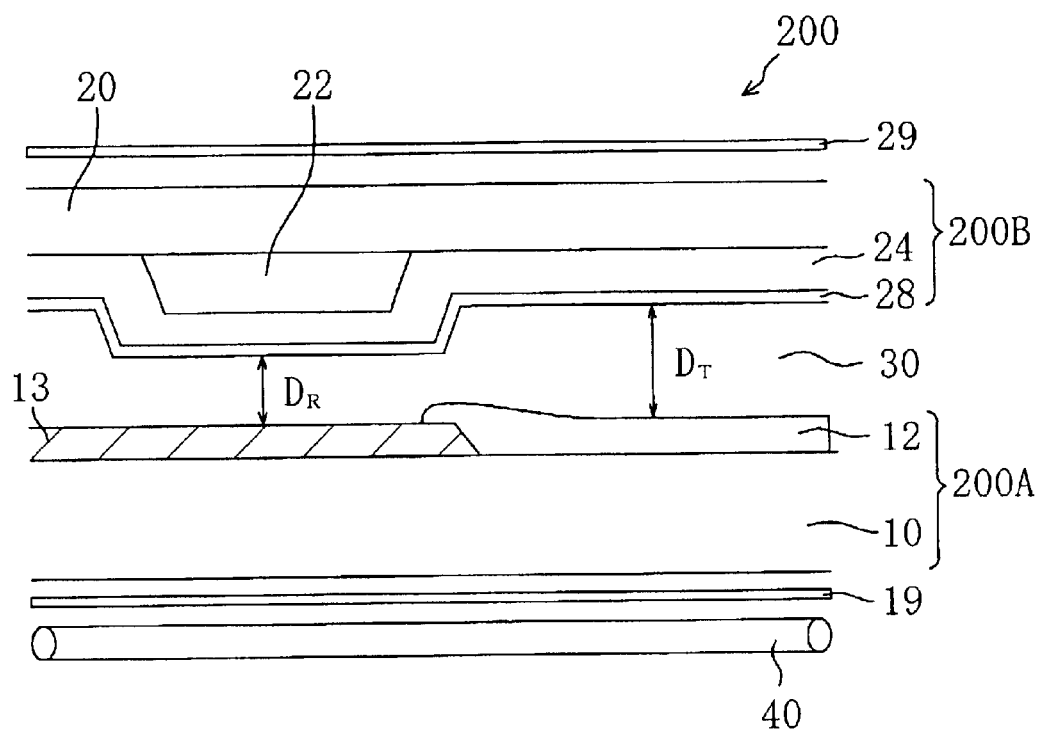
FIG. 12 is a schematic cross-sectional view of an LCD 200 according to a second embodiment of the present invention.

FIG. 12 schematically shows the cross-sectional structure of an LCD 200 according to the second embodiment of the present invention. The LCD 200 of the second embodiment is different from the LCD 100 of the first embodiment in the structure of an active matrix substrate 200A. In FIG. 12 and the following figures, components having substantially the same function as that of the components in the LCD 100 of the first embodiment are denoted with the same reference numerals and characters, and description thereof is omitted.

As shown in FIG. 12, in the LCD 200 of the second embodiment, the level of the surface of the active matrix substrate 200A which faces the liquid crystal layer 30 is substantially the same in both the transmission region Tr and the reflection region Rf.

Moreover, in the LCD 200, the level of the surface of a color filter substrate 200B which faces the liquid crystal layer 30 is higher in the reflection region Rf than in the transmission region Tr. More specifically, the height of the color filter layer 24 (i.e., the level of the surface of the color filter layer 24 which faces the liquid crystal layer 30) on the transparent dielectric layer 22 within the reflection region Rf is higher than the height of the color filter layer 24 (i.e., the level of the surface of the color filter layer 24 which faces the liquid crystal layer 30) in the transmission region Tr. Accordingly, the surface of the color filter substrate 200B is elevated in the reflection region Rf. Moreover, the transparent dielectric layer 22 has approximately the same size (area) as that of the reflection region Rf, and overlaps almost the whole reflection region Rf. However, a plurality of transparent dielectric layers 22 may alternatively be formed in each reflection region Rf, as described in the first embodiment.

For example, the LCD 200 of the second embodiment having the above structure can be manufactured by the following method:

First, the color filter substrate 200B is manufactured. The transparent dielectric layer 22 having a thickness of about 3.2 µm is formed on the transparent insulating substrate 20. The color filter layer 24 is then formed so as to have a thickness of about 1.4 µm in a region having no transparent dielectric layer 22. In this case, the color filter layer 24 has a reduced thickness of about 0.7 µm on the transparent dielectric layer 22. Therefore, the surface of the color filter layer 24 has a difference in level of about 2.5 µm.

Thereafter, the active matrix substrate 200A is manufactured so that the level of the surface of the active matrix substrate 200A which faces the liquid crystal layer 30 is substantially the same in both the transmission region Tr and the reflection region Rf. It is herein assumed that the active matrix substrate 200A is manufactured so that the area ratio of the reflection region Rf to the transmission region Tr is 8:2. Such an active matrix substrate 200A can be manufactured by a known method. Unlike the active matrix substrate 100A of the LCD 100 of the first embodiment, it is not necessary to form an interlayer insulating film for adjusting the level of the surface of the reflecting electrode 13.

The color filter substrate 200B and the active matrix substrate 200A thus manufactured are then laminated each other with a cell gap of about 2.5 µm in the reflection region Rf. More specifically, the color filter substrate 200B and the active matrix substrate 200A are laminated each other after columnar spacers having a height of about 2.5 µm or spherical spacers having a diameter of about 2.5 µm are disposed within the reflection region Rf. As a result, the cell gap in the transmission region Tr is about 5.0 µm, which is the sum of the height of the spacers (about 2.5 µm) and the difference in level of the surface of the color filter layer 24 (about 2.5 µm). A liquid crystal material is then introduced into the gap between the color filter substrate 200B and the active matrix substrate 200A.

In the LCD 200 thus manufactured, the liquid crystal layer 30 has a thickness $D_R$ of about 2.5 µm in the reflection region Rf, and has a thickness $D_T$ of about 5.0 µm in the transmission region Tr. In other words, the thickness $D_R$ of the liquid crystal layer 30 in the reflection region Rf is about half the thickness $D_T$ of the liquid crystal layer 30 in the transmission region Tr. Accordingly, light passing through the reflection region Rf has the same optical path length as that of light passing through the transmission region Tr. This enables implementation of display with a high contrast ratio. It should be understood that, like the LCD 100 of the first embodiment, the LCD 200 of the second embodiment implements bright display with high color purity in both the transmission region Tr and the reflection region Rf.

In the LCD 200 of the second embodiment, the level of the surface of the active matrix substrate 200A is substantially the same in both the transmission region Tr and the reflection region Rf. Moreover, the level of the surface of the color filter substrate 200B is higher in the reflection region Rf than in the transmission region Tr. This ensures that the thickness $D_R$ of the liquid crystal layer 30 in the reflection region Rf is smaller than the thickness $D_T$ of the liquid crystal layer 30 in the transmission region Tr in the LCD 200.

In other words, in the LCD 200, the surface of the active matrix substrate 200A is not elevated in the reflection region Rf but the surface of the color filter substrate 200B is elevated in the reflection region Rf in order to provide thickness distribution of the liquid crystal layer 30.

Accordingly, the manufacturing process of the LCD 200 need not include the step of making the surface of the active matrix substrate 200A higher in the reflection region Rf than in the transmission region Tr (e.g., the step of forming the interlayer insulating film 15 in the reflection region Rf of the active matrix substrate 100B, as described in the first embodiment). As a result, the LCD 200 having a multi-gap structure according to the present embodiment can be manufactured by a simple manufacturing process.

In the LCD 200, the multi-gap structure is implemented by providing the difference in level between the surface of the color filter substrate 200B in the transmission region Tr and the surface of the color filter substrate 200B in the reflection region Rf. This increases the ratio of the region contributing to display within a picture-element region, enabling further improvement in brightness. The reason for this will now be described.

Figure 13A:
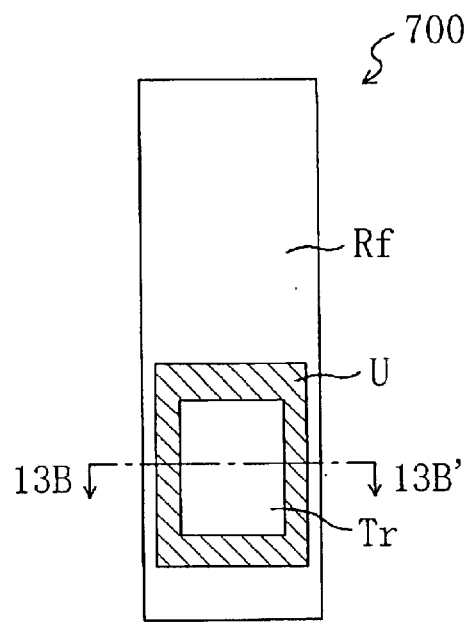
FIG. 13A is a schematic top view of an LCD 700 in which a multi-gap structure is implemented by providing the difference in level in the surface of an active matrix substrate 700A.
Figure 13B:
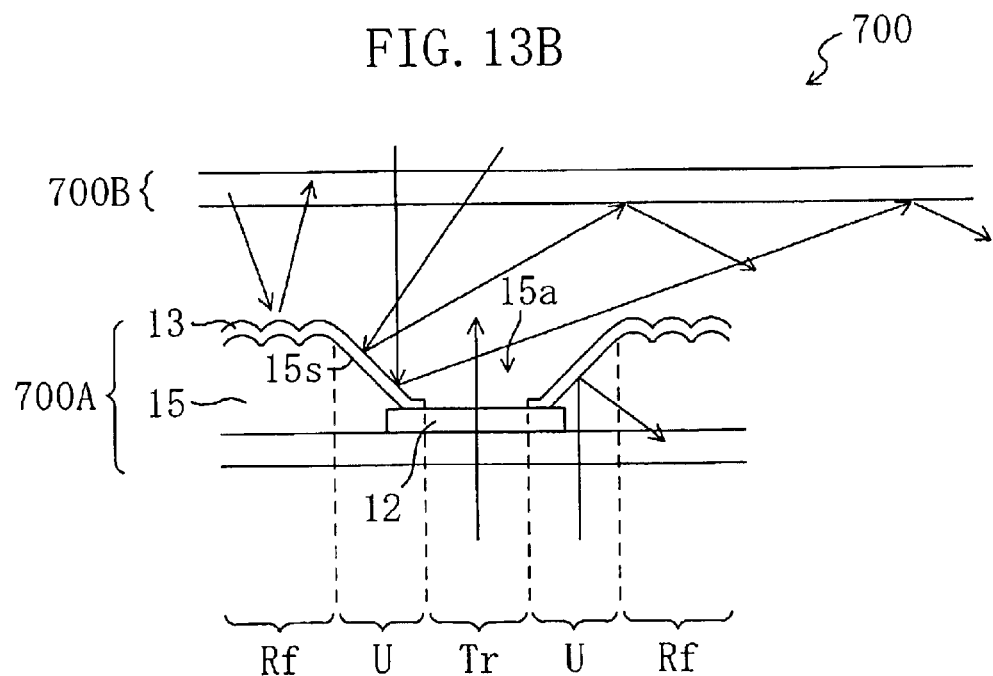
FIG. 13B is a cross-sectional view taken along line 13B—13B' in FIG. 13A.

FIGS. 13A and 13B schematically show an LCD 700 having a multi-gap structure. The multi-gap structure of the LCD 700 is implemented by providing the difference in level between the surface of an active matrix substrate 700A in the transmission region Tr and the surface of the active matrix substrate 700A in the reflection region Rf. FIG. 13A is a schematic top view of a single picture element in the LCD 700, and FIG. 13B is a cross-sectional view taken along line 13B–13B' in FIG. 13A.

In the LCD 700, the reflecting electrode 13 is formed on the interlayer insulating film 15. The interlayer insulating film 15 has a tapered opening 15a in order to expose the transparent electrode 12. The interlayer insulating film 15 has a tilted side surface 15s surrounding the opening 15a. Typically, the reflecting electrode 13 covers the tilted side surface 15s.

If the reflecting electrode 13 covering the tilted side surface 15s efficiently reflects outside light toward a viewer, the region where the tilted side surface 15s is present would function as a reflection region Rf. Actually, however, the tilted side surface 15a is tapered at an average of about 45°. Therefore, light reflected by the reflecting electrode 13 on the tilted side surface 15s is repeatedly subjected to internal reflection, and therefore is hardly emitted from the color filter substrate toward the viewer. Accordingly, the region where the tilted side surface 15s is present is an invalid region U which does not contribute to display.

According to the examination result of the inventor, in a transmission/reflection combination type LCD of a certain specification in which the area ratio of the reflection region Rf to the transmission region Tr is 72:28 and the proportion of the reflection region Rf and the transmission region Tr in the picture-element region (i.e., the aperture ratio) is 58.0% and 22.7%, respectively, the proportion (area ratio) of the invalid region U was about 8%.

Figure 14:
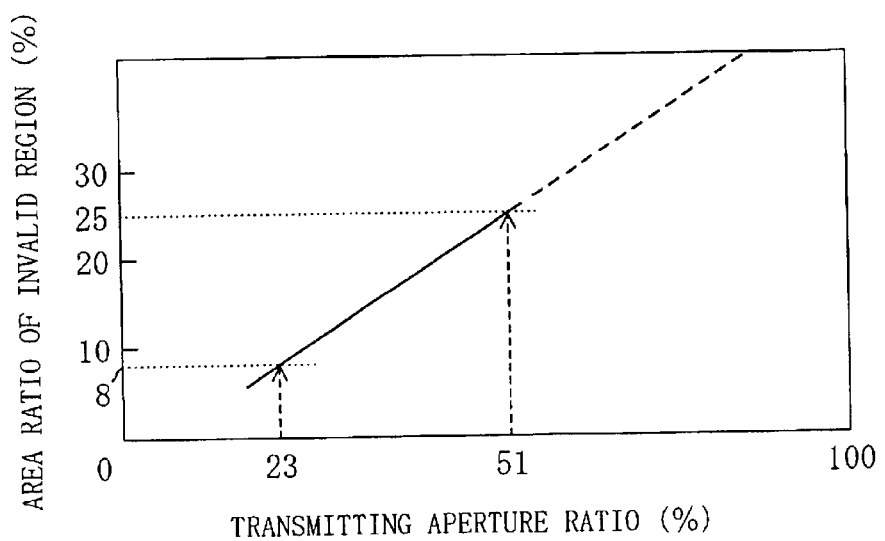
FIG. 14 is a graph showing the relation between the transmitting aperture ratio (%) and the area ratio (%) of an invalid region.

This proportion of the invalid region U increases as the proportion of the transmission region Tr in the picture-element region increases. FIG. 14 shows the relation between the proportion of the transmission region Tr in the picture-element region, that is, the transmitting aperture ratio (%), and the area ratio (%) of the invalid region U.

As shown in FIG. 14, the area ratio of the invalid region U is about 8% when the transmitting aperture ratio is about 23%. However, the area ratio of the invalid region U is about 25% when the transmitting aperture ratio is about 51%. In this way, as the transmitting aperture ratio is increased, the area ratio of the invalid region U is increased and light utilization efficiency is reduced.

On the other hand, in the LCD 200 of FIG. 12, the multi-gap structure is implemented by providing the difference in level between the surface of the color filter substrate 200B in the transmission region Tr and the surface of the color filter substrate 200B in the reflection region Rf. Therefore, there is no such invalid region (the region where the reflecting electrode is formed on the tilted side surface). This enables improvement in light utilization efficiency, and thus enables further improvement in brightness.

As described above, in order to improve the light utilization efficiency, it is preferable to implement the multi-gap structure by providing the difference in level in the surface of the color filter substrate without providing the difference in level in the surface of the active matrix substrate. Forming a reflecting electrode on an opaque component (such as a storage capacitor line) would enable further improvement in light utilization efficiency.

Figure 15:
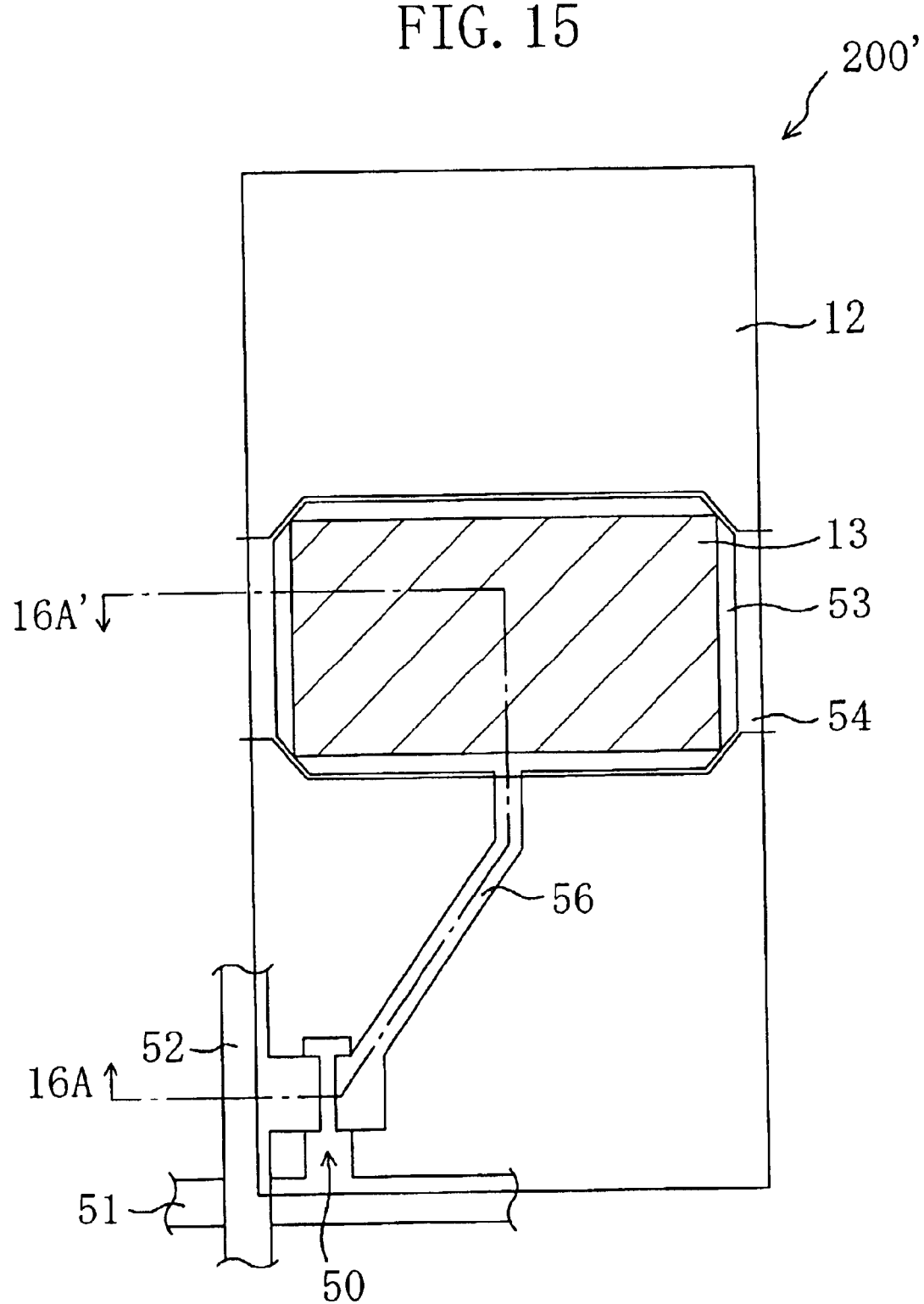
FIG. 15 is a schematic top view of another LCD 200' according to the second embodiment of the present invention.
Figure 16:
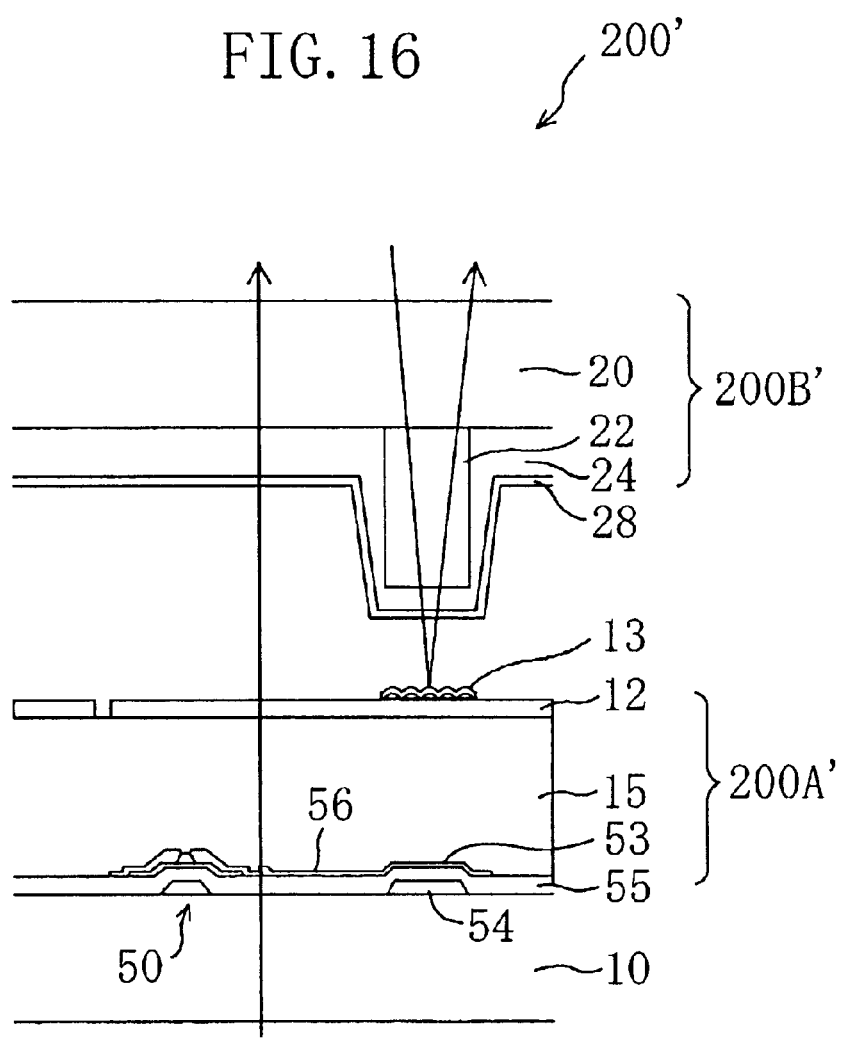
FIG. 16 is a schematic cross-sectional view taken along line 16A—16A' in FIG. 15.

FIGS. 15 and 16 show another LCD 200' according to the present embodiment. In the LCD 200', a reflecting electrode is located above a storage capacitor line 54. FIG. 15 is a schematic top view of the LCD 200', and FIG. 16 is a cross-sectional view taken along line 16A–16A' in FIG. 15.

An active matrix substrate 200A' of the LCD 200' includes a transparent insulating substrate 10, TFTs 50, scanning lines 51, signal lines 52, and picture-element electrodes (each picture-element electrode includes a transparent electrode 12 and a reflecting electrode 13). The TFTs are formed on the transparent insulating substrate 10. Each scanning line 51, each signal line 52 and each picture-element electrode are electrically connected to a corresponding TFT 50. The active matrix substrate 200A' further includes storage capacitor electrodes 53 and storage capacitor lines 54.

Typically, a gate insulating film 55 is formed almost over the whole surface of the active matrix substrate 200A' so as to cover the gate electrodes of the TFTs 50, the scanning lines 51 and the storage capacitor lines 54. A semiconductor layer forming the TFTs 50 (the semiconductor layer includes a source region, a channel region and a drain region), the signal lines 52, the storage capacitor electrodes 53 and connection lines 56 are formed on the gate insulating film 55. Each connection line 56 electrically connects the drain electrode of a corresponding TFT 50 with a corresponding storage capacitor electrode 53.

An interlayer insulating film 15 is formed almost over the whole surface of the active matrix substrate 200A' so as to cover the above elements. Picture-element electrodes each including a transparent electrode 12 and a reflecting electrode 13 are formed on the interlayer insulating layer 15. Each picture-element electrode is electrically connected to a corresponding storage capacitor electrode 53 via a corresponding contact hole formed in the interlayer insulating film 15. In other words, each picture-element electrode is electrically connected to the drain electrode of a corresponding TFT 50 through a corresponding storage capacitor electrode 53 and a corresponding connection line 56.

The reflecting electrode 13 is located above the storage capacitor line 54. Moreover, the reflecting electrode 13 is formed on the transparent electrode 12 and has an uneven surface. More specifically, the interlayer insulating film 15 located under the reflecting electrodes 13 has an uneven surface by a photolithography method. Therefore, the transparent electrode 12 and the reflecting electrode 13 formed on the uneven surface of the interlayer insulating film 15 have an uneven surface corresponding to the surface profile of the interlayer insulating film 15.

Like the LCD 200 of FIG. 12, the multi-gap structure of the LCD 200' is implemented by providing the difference in level in the surface of the color filter substrate 200B' without providing the difference in level in the surface of the active matrix substrate 200A'. Therefore, there is no invalid region (the region where the reflecting electrode is formed on the tilted side surface). Moreover, the reflecting electrode 13 is located above the storage capacitor line 54. This allows the region having a typically opaque storage capacitor line 54 to function as a reflection region Rf and contribute to display. As a result, the light utilization efficiency can further be improved.

Third Embodiment

Figure 17:
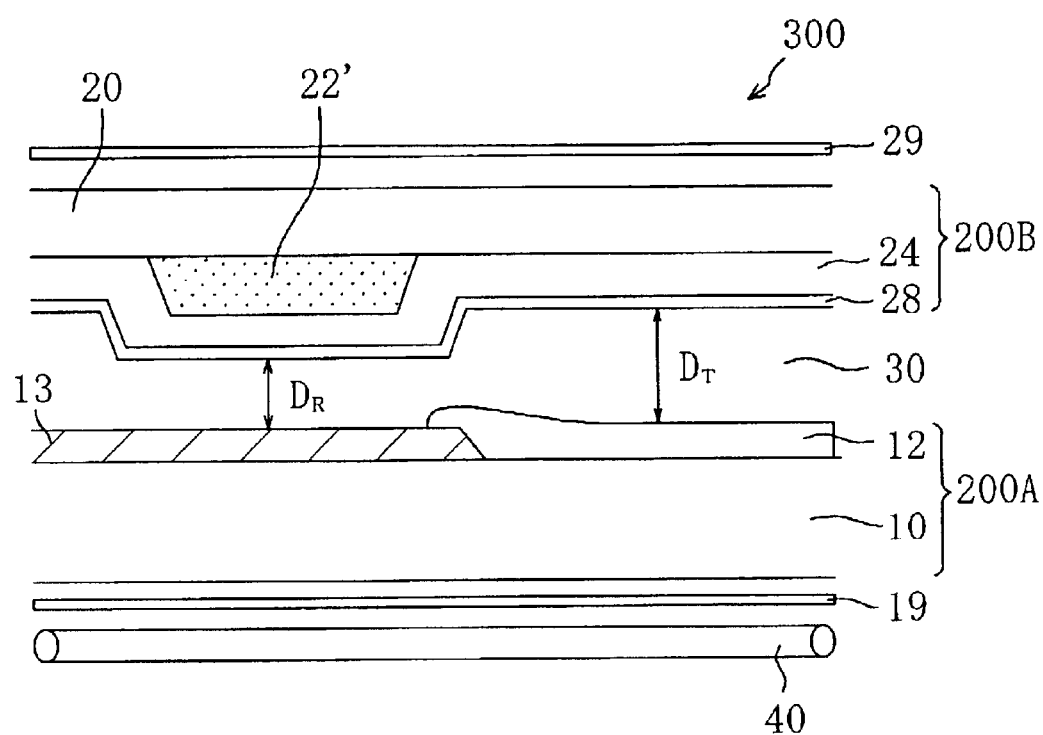
FIG. 17 is a schematic cross-sectional view of an LCD 300 according to a third embodiment of the present invention.

FIG. 17 schematically shows the cross-sectional structure of an LCD 300 according to the third embodiment of the present invention. The LCD 300 of the third embodiment is different from the LCD 200 of the second embodiment in that the LCD 300 includes a transparent dielectric layer 22' having a light-diffusing function. In FIG. 17, components having substantially the same function as that of the components of the LCD 200 of the second embodiment are denoted with the same reference numerals and characters, and description thereof is omitted.

The color filter substrate 200B in the LCD 300 of the third embodiment includes a transparent dielectric layer 22' having a light-diffusing function. Like the LCD 200 of the second embodiment, the transparent dielectric layer 22' is formed in at least a part of the reflection region Rf.

Typically, the transparent dielectric layer 22' having a light-diffusing function is formed from a transparent matrix material having a filler dispersed therein. The filler used herein has a refractive index different from that of the matrix material. As an example, the transparent dielectric layer 22' having a thickness of about 2.8 $\mu$m was formed from a transparent acrylic photosensitive resin (refractive index: about 1.49) mixed with about 20 weight % of silica beads (average particle size: about 1.5 $\mu$m, refractive index: about 1.40). In this case, a haze factor (diffuse transmittance) of the transparent dielectric layer 22' was about 60%.

The LCD 300 of the present embodiment includes a transparent dielectric layer 22' having a light-diffusing function. Therefore, light passing through the reflection region Rf is diffused by the transparent dielectric layer 22', whereby white display close to paper white is implemented.

Since the transparent dielectric layer 22' has a light-diffusing function, the reflecting electrode 13 having a flat surface can be used as shown in FIG. 17. Forming the reflecting electrode 13 having an uneven surface requires a complicated step of accurately controlling the surface profile of the reflecting electrode 13, and also causes variation in thickness $D_R$ of the liquid crystal layer 30 in the reflection region Rf. This may make it difficult to implement optimal display. The use of the reflecting electrode 13 having a flat surface enables implementation of white display close to paper white while preventing such a problem.

If the reflecting electrode 13 has an uneven surface, interference may occur due to the uneven surface. However, combining the reflecting electrode 13 having an uneven surface with the transparent dielectric layer 22' having a light-diffusing function eliminates such interference, enabling implementation of excellent white display close to paper white.

The use of the transparent dielectric layer 22' having a light-diffusing function is advantageous in the following points: white display close to paper white can be implemented regardless of the surface profile of the reflecting electrode 13. Moreover, since the transparent dielectric layer 22' is provided only in the reflection region Rf, display characteristics of the reflection region Rf can be improved without adversely affecting display characteristics of the transmission region Tr.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display, comprising:
   a first substrate;
   a second substrate;
   a liquid crystal layer interposed between the first and second substrates;
   a plurality of picture-element regions for providing display;
   wherein each of the plurality of picture-element regions comprises a transmission region for providing display in a transmission mode by using light incident through the first substrate, and a reflection region for providing display in a reflection mode by using light incident through the second substrate,
   wherein the second substrate comprises a transparent substrate and a color filter layer provided in the transmission region and the reflection region;
   wherein a thickness of the color filter layer in at least a part of the reflection region is smaller than a thickness of the color filter layer in the transmission region; and
   wherein, at least in the reflection region of one of the picture-element regions, the second substrate comprises a plurality of spaced apart transparent dielectric layers between the transparent substrate and the color filter layer.

2. The liquid crystal display device according to claim 1, wherein, in at least part of the reflection region for each of the picture-element regions, the second substrate comprises a plurality of spaced apart transparent dielectric layers between the transparent substrate and the color filter layer.

3. The liquid crystal display device according to claim 1, wherein a thickness of the liquid crystal layer in the transmission region is larger than a thickness of the liquid crystal layer in the reflection region.

4. The liquid crystal display device according to claim 3, wherein a level of a surface of the first substrate which faces the liquid crystal layer is higher in the reflection region than in the transmission region.

5. The liquid crystal display device according to claim 1, wherein a height of the color filter layer is greater in at least the part of the reflection region where at least one of the transparent dielectric layers is formed than in the transmission region, whereby a level of a surface of the second substrate which faces the liquid crystal layer is higher in the reflection region than in the transmission region, and
   a level of a surface of the first substrate which faces the liquid crystal layer is substantially the same in both the reflection region and the transmission region.

6. The liquid crystal display device according to claim 5, wherein the first substrate comprises both a transparent electrode provided in at least the transmission region and a reflecting electrode provided in at least the reflection region;
   the transparent electrode and the reflecting electrode are at approximately the same level.

7. The display of claim 1, wherein a height of the color filter layer is different in at least part of the reflection region than in at least part of the transmission region, so that the color filter layer protrudes further toward the liquid crystal layer in at least part of the reflection region than in at least part of the transmission region.

8. The display of claim 1, further comprising a black matrix located between different colored areas of said color filter layer.

9. A liquid crystal display device, comprising:
   a liquid crystal layer interposed between first and second substrates;
   a plurality of picture-element regions for providing display;
   wherein:
   at least one of the picture-element regions has a transmission region for providing display in a transmission mode by using light incident through the first substrate, and a reflection region for providing display in a reflection mode by using light incident through the second substrate,
   the second substrate comprises a transparent substrate and a color filter layer, and wherein a thickness of the color filter layer in at least a part of the reflection region is smaller than a thickness of the color filter layer in the transmission region,
   the second substrate further comprises at least one transparent dielectric layer formed between the transparent substrate and the color filter layer in at least the part of the reflection region,
   a height of the color filter layer is greater in at least the part of the reflection region where the at least one transparent dielectric layer is formed than in the transmission region, so that a level of a surface of the second substrate which faces the liquid crystal layer is higher in the reflection region than in the transmission region;
   a level of a surface of the first substrate which faces the liquid crystal layer is substantially the same in both the reflection region and the transmission region; and
   wherein the first substrate comprises both a transparent electrode provided in at least the transmission region and a reflecting electrode provided in at least the reflection region, and wherein the transparent electrode and the reflecting electrode of the first substrate are at approximately the same level.

10. The liquid crystal display device according to claim 9, wherein the transparent dielectric layer has a light-diffusing function.

11. The liquid crystal display device according to claim 10, wherein the transparent dielectric layer includes a transparent matrix material and a filler which is dispersed in the transparent matrix material and has a refractive index different from that of the transparent matrix material.

12. A transflective liquid crystal display, comprising:
   a liquid crystal layer interposed between first and second substrates;
   a plurality of picture-element regions for providing display;
   wherein at least one of the picture-element regions comprises: a transmission region for providing display in a transmission mode by using light incident through the first substrate, and a reflection region for providing display in a reflection mode by using light incident through the second substrate,
   the first substrate comprising both a transparent electrode provided in at least the transmission region for use in the transmission mode, and a reflecting electrode provided in at least the reflection region for use in the reflection mode;
   wherein the second substrate comprises a color filter layer provided in the transmission region and the reflection region, wherein a thickness of the color filter layer in at least a part of the reflection region is smaller than a thickness of the color filter layer in at least part of the transmission region; and wherein no insulating layer is provided between at least some respective parts of the transparent electrode and the reflecting electrode of the first substrate so that at least said parts of the transparent electrode and reflecting electrode are in contact with one another, and wherein the transparent and reflecting electrodes are at approximately the same level even though one may at least partially overlap the other.

13. The display of claim 12, wherein a height of the color filter layer is different in at least part of the reflection region than in at least part of the transmission region, so that the color filter layer protrudes further toward the liquid crystal layer in at least part of the reflection region than in at least part of the transmission region.

14. The display of claim 12, further comprising a black matrix located between different colored areas of said color filter layer.

15. A transflective liquid crystal display, comprising:
a first substrate;
a second substrate;
a liquid crystal layer interposed between the first and second substrates;
a plurality of picture regions for providing display;
wherein at least one of the picture regions comprises a transmission region for providing display in a transmission mode by using light incident through the first substrate, and a reflection region for providing display in a reflection mode by using light incident through the second substrate,
the first substrate comprising both a transparent electrode provided in at least the transmission region for use in the transmission mode, and a reflecting electrode provided in at least the reflection region for use in the reflection mode;
wherein the second substrate comprises a color filter layer provided in the transmission region and the reflection region, wherein a thickness of the color filter layer in at least a part of the reflection region is smaller than a thickness of the color filter layer in at least part of the transmission region; and
wherein no insulating layer is provided between the transparent electrode and the reflecting electrode of the first substrate so that they are in contact with one another, with one of the reflecting and transparent electrodes at least partially overlapping the other of the reflecting and transparent electrodes.

16. The display of claim 15, wherein a height of the color filter layer is different in at least part of the reflection region than in at least part of the transmission region, so that the color filter layer protrudes further toward the liquid crystal layer in at least part of the reflection region than in at least part of the transmission region.

17. The display of claim 15, further comprising a black matrix located between different colored areas of said color filter layer.

* * * * *